United States Patent
Nagatome

[19]
[11] Patent Number: 6,098,164
[45] Date of Patent: Aug. 1, 2000

[54] MICROPROCESSOR WITH COMMON BUS FOR MEMORY AND PERIPHERAL CIRCUIT HAVING DATA LATCH GENERATOR

[75] Inventor: Toshihide Nagatome, Tokyo, Japan

[73] Assignee: Oki Electric Industry Co., Ltd., Tokyo, Japan

[21] Appl. No.: 08/851,075

[22] Filed: May 5, 1997

[30] Foreign Application Priority Data

May 24, 1996 [JP] Japan .................................. 8-130267

[51] Int. Cl.[7] .............................. G06F 13/00; G06F 13/16
[52] U.S. Cl. .............................................. 712/32; 711/167
[58] Field of Search ............................. 395/285; 712/32; 710/8, 5, 58; 713/400; 711/168, 167, 169

[56] References Cited

U.S. PATENT DOCUMENTS

| | | | |
|---|---|---|---|
| 3,974,479 | 8/1976 | Kotok et al. ........................ | 340/172.5 |
| 4,106,090 | 8/1978 | Erickson et al. ...................... | 364/200 |
| 4,509,120 | 4/1985 | Daudelin ............................... | 395/836 |
| 4,694,391 | 9/1987 | Guttag et al. ......................... | 364/200 |
| 4,870,562 | 9/1989 | Kimoto et al. ...................... | 364/232.8 |
| 5,218,693 | 6/1993 | Ogita ..................................... | 395/557 |
| 5,463,753 | 10/1995 | Fry et al. .............................. | 395/473 |
| 5,469,547 | 11/1995 | Pawlowski ............................ | 395/285 |
| 5,586,337 | 12/1996 | Kusakabe ............................. | 395/800 |
| 5,649,161 | 7/1997 | Andrade et al. ..................... | 395/494 |
| 5,655,142 | 8/1997 | Gephard et al. .................. | 395/800.32 |

FOREIGN PATENT DOCUMENTS

| | | |
|---|---|---|
| 0 238 090 | 9/1987 | European Pat. Off. . |
| 0 487 910 A1 | 6/1992 | European Pat. Off. . |
| 0 624 846 | 11/1994 | European Pat. Off. . |

*Primary Examiner*—Emmanuel L. Moise
*Assistant Examiner*—Shelly A. Chase
*Attorney, Agent, or Firm*—Jones Volentine, LLP

[57] ABSTRACT

Disclosed herein is a microcomputer of the present invention. The microcomputer comprises a memory, a peripheral circuit including a circuit whose change of state is fast and which latches data to be held by the circuit therein in response to a data latch signal and outputs the latched data therefrom in response to a first read control signal and a data latch signal generating circuit supplied with the first read control signal so as to generate the data latch signal whose signal time interval is shorter than that of the first read control signal, and a central processing unit which is connected to the memory and the peripheral circuit through a common bus and which outputs an address signal for specifying the circuit and the first read control signal to the common bus to perform access to the circuit and outputs an address signal for specifying the memory and a second read control signal shorter than the first read control signal in signal time width to the common bus to make access to the memory

12 Claims, 4 Drawing Sheets

MICROPROCESSOR WITH COMMON BUS FOR MEMORY AND PERIPHERAL CIRCUIT HAVING DATA LATCH GENERATOR

BACKGROUND OF THE INVENTION

1. Field of the Invention

This invention relates to a microcomputer having a central processing unit (hereinafter called "CPU"), a memory and a peripheral function unit or the like integrally formed on a semiconductor substrate. The present invention particularly relates to a technique providing access to a peripheral function unit of a memory mapped I/O type microcomputer wherein a memory and the peripheral function unit are disposed in the same address space.

2. Description of the Related Art

A conventional microcomputer is one wherein a CPU, a memory comprising a Read Only Memory (hereinafter called "ROM") and a Random Access Memory (hereinafter called "RAM"), and a peripheral function unit having a timer, an analog-to-digital (hereinafter called "A/D") converter, a parallel input/output portion, a series input/output portion, etc. have been formed on a single semiconductor substrate. This microcomputer is called "one-chip microcomputer". The CPU, the memory and the peripheral function unit are electrically connected to one another by an address bus, a data bus and a control bus common to them. The CPU, the memory and the peripheral function unit are disposed within the same address space and provides an address system referred to as a so-called memory mapped I/O type.

In this type of memory mapped I/O type microcomputer, the same memory reference instruction as that used for access to the memory is used for read/write access to the peripheral function unit. Further, the microcomputer is activated in the same timing as that provided for the memory.

SUMMARY OF THE INVENTION

An object of the present invention is to provide a microcomputer capable of reading data from a rapid-activated peripheral function unit in proper timing.

Another object of the present invention is to provide a microcomputer exerting no influence upon a memory access speed even if a number of peripheral function units are connected.

According to one aspect of the present invention, for achieving the above objects, there is provided a microcomputer comprising:

a memory;

a peripheral circuit including a circuit whose change of state is fast and which latches data to be held by the circuit therein in response to a data latch signal and outputs the latched data therefrom in response to a first read control signal, and a data latch signal generating circuit supplied with the first read control signal so as to generate the data latch signal whose signal time width is shorter than that of the first read control signal; and a central processing unit connected to the memory and the peripheral circuit through a common bus, for outputting an address signal for specifying the circuit and the first read control signal to the common bus to perform access to the circuit and outputting an address signal for specifying the memory and a second read control signal whose signal time width is shorter than that of the first read control signal, to the common bus to make access to the memory.

Typical ones of various inventions of the present application have been shown in brief. However, the various inventions of the present application and specific configurations of these inventions will be understood from the following description.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DETAILED DESCRIPTION OF THE PREFERRED EMBODIMENT

A preferred embodiment of the present invention will hereinafter be described in detail with reference to the accompanying drawings.

Figure 1:
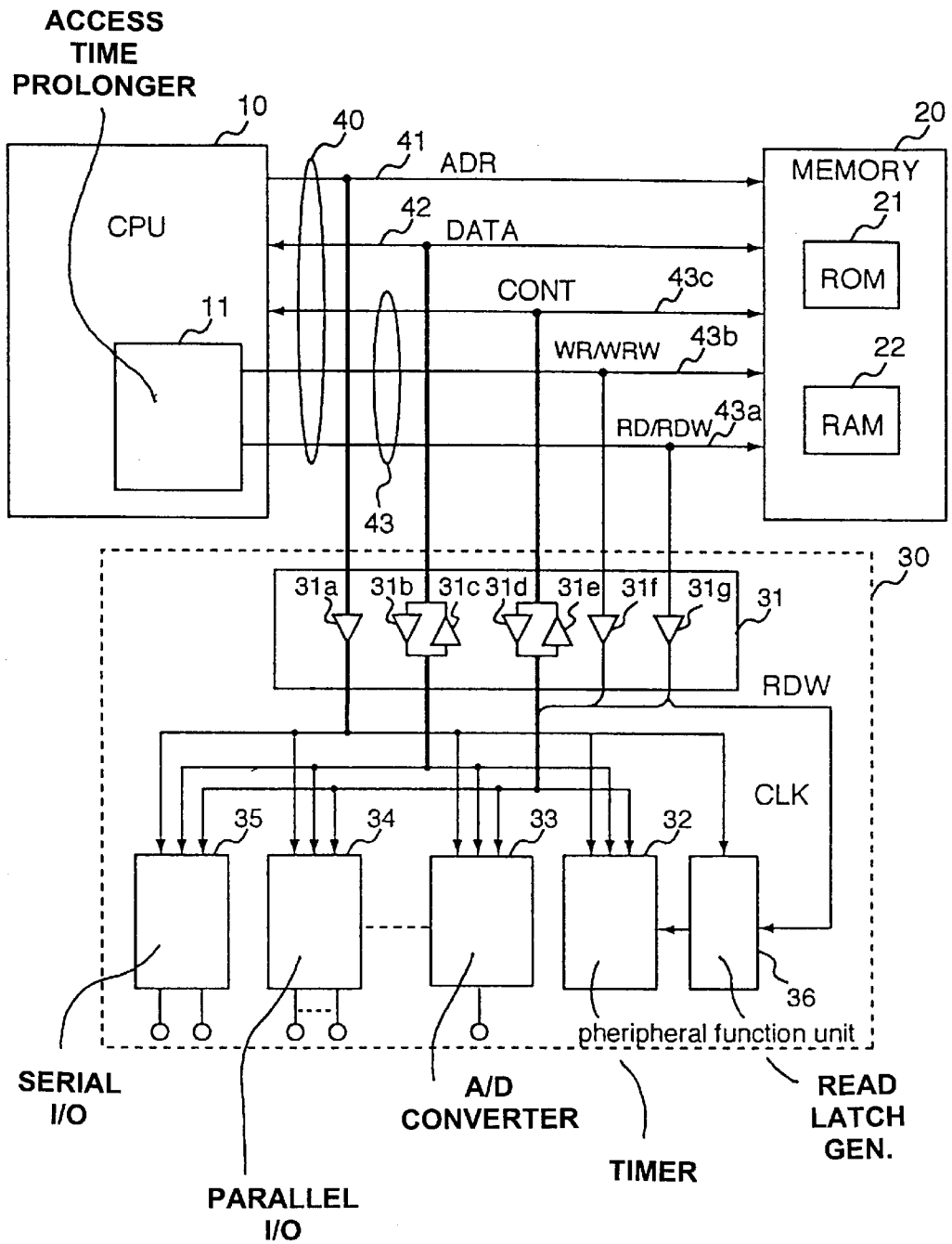
FIG. 1 is a diagram showing a configuration of a microcomputer according to one embodiment of the present invention.

FIG. 1 is a diagram schematically showing a configuration of a microcomputer according to one embodiment of the present invention.

The present microcomputer comprises a CPU 10, a memory 20, a peripheral function unit 30. A common bus 40 is electrically connected among the CPU 10, the memory 20 and the peripheral function unit 30. The CPU 10 serves as a logic central unit of the microcomputer. The CPU 10 has a system controller, a computational or arithmetic unit, a register unit, an arithmetic controller, a common bus controller, etc. all of which are not shown in the drawing. The CPU 10 is a circuit for performing digital processing such as execution of addressing, reading and writing of data, arithmetic operations on data, an instruction sequence, etc. according to a memory reference instruction, on the basis of programs stored in the memory 20. The CPU 10 has an access time prolonging means (e.g., an access time prolonger) 11. The access time prolonger 11 has the function of generating a read control signal RDW and a write control signal WRW to prolong or extend an access time to the peripheral function unit 30.

The memory 20 has a ROM 21 and a RAM 22. The ROM 21 is a read only memory. The ROM 21 always holds data written therein, regardless of the turning on and off of a power source and is used to store a program including the memory reference instruction and fixed data therein. The RAM 22 is a random access memory. When the power source is turned off, the contents held in the RAM 22 disappear. Therefore, the RAM 22 is often used as a region for temporarily storing or processing data.

The peripheral function unit 30 has a separating means (e.g., a buffer amplifier) 31 for connecting inter circuits within the peripheral function unit 30 to the common bus 40. The buffer amplifier 31 serves as a circuit for disconnecting loads on the peripheral function unit 30 as seen from the CPU 10 side and the memory 20 side. The buffer amplifier 31 includes amplifiers 31a, 31b, . . . for respectively amplifying signals supplied from the CPU 10 through the common bus 40 and supplying the amplified signals to input/output portions provided within the peripheral function unit 30 and for respectively amplifying signals outputted from the input/output portions in the peripheral function unit 30 and outputting them to the CPU 10. Each of the amplifiers 31a, 31b, . . . is composed of inverters connected in two stages by way of example. The input/output portions such as a timer 32, an A/D converter 33, a parallel input/output portion 34, a series input/output portion 35, etc. are electrically connected to the buffer amplifier 31.

The timer 32 counts a time. The timer 32 holds data about the counted time therein according to a data hold or latch signal (e.g., read latch signal) RDL. Further, the timer 32 reads the time data held therein in response to the read control signal RDW. Each of the A/D converter 33 and the like swaps a signal with the outside. Namely, each of the A/D converter 33 and the like outputs a signal to the outside or inputs a signal from the outside in response to the write control signal WRW and the read control signal RDW.

The peripheral function unit 30 has a data latch signal generating means (e.g., a read latch generator 36). The read latch generator 36 generates a read latch signal RDL for instructing, for example, the timer 32 having a fast operating speed, of the peripheral function unit 30 to hold or latch data in order to read the data in proper timing. The output of the read latch generator 36 is electrically connected to the timer 32.

The common bus 40 comprises an address bus 41, a data bus 42 and a control bus 43. The address bus 41 is a common signal line for transmitting an address signal ADR for specifying a read or write address from the CPU 10 to the memory 20 and the peripheral function unit 30. The data bus 42 is a common signal line used for transferring a data signal DATA from the CPU 10 to the memory 20 or the peripheral function unit 30 and transferring a data signal DATA from the memory 20 or the peripheral function unit 30 to the CPU 10. The control bus 43 is a common signal line used for allowing the CPU 10 to control, for example, the reading of data from and writing of it into the memory 20 and the peripheral function unit 30. The control bus 43 consists of a read control line 43a for transferring a read control signal RD and a read control signal RDW, a write control line 43b for transferring a write control signal WR and a write control signal WRW, and a control line 43c for transmitting a clock signal CLK and other control signals.

Figure 2:
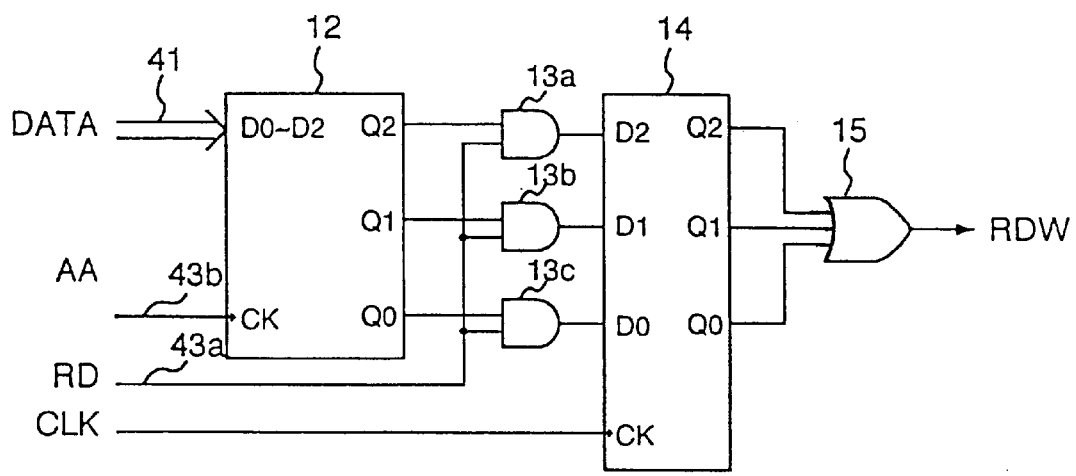
FIG. 2 is a diagram illustrating a configuration of an access time prolonger.

FIG. 2 is a configurational diagram showing one example of the access time prolonger 11 shown in FIG. 1.

The access time prolonger 11 has a three-bit D-type (delay-type) flip-flop (hereinafter called "FF") 12. The three bits for internal buses provided within the CPU 10 are connected or inputted to input terminals D0, D1 and D2 of the FF 12. Further, a control signal AA is inputted to a clock terminal CK of the FF 12. Output terminals Q0, Q1 and Q2 of the FF 12 are respectively electrically connected to one inputs of AND gates 13a, 13b and 13c. The other inputs of the AND gates 13a through 13c are electrically connected to the read control line 43a. The outputs of the AND gates 13a through 13c are electrically connected to their corresponding input terminals D0, D1 and D2 of a down counter 14. When values provided to output terminals Q0 through Q2 of the down counter 14 reach "0", the down counter 14 reads signals inputted to the input terminals D0 through D2. The down counter 14 counts down the read values one by one in synchronism with the leading edge of a clock signal CLK inputted to the clock terminal CK and outputs them to the output terminals Q0 through Q2. The output terminals Q0, Q1 and Q2 of the down counter 14 are electrically connected to their corresponding inputs of a three-input OR gate 15.

The function of the access time prolonger 11 will now be described.

At a program initializing portion, for example, a numeric value "3" is supplied to each of the input terminals D0 through D2 of the FF 12 in advance. The FF 12 captures or takes in the numeric value "3" in response to the input of the control signal AA and outputs it from the output terminals Q0 through Q2. When the read control signal RD is inputted (i.e., when the inputs of the AND gates 13a through 13c are "H" in level), the output signals of the FF 12 pass through their corresponding AND gates 13a through 13c and are thereafter supplied to their corresponding input terminals D0 through D2 of the down counter 14. The input terminals D0 through D2 of the down counter 14 are respectively supplied with a numeric value "0" until the instant preceding the input of the read control signal RD. Further, the values provided to the output terminals Q0 through Q2 are also "0". Therefore, when the input terminals D0 through D2 of the down counter 14 are respectively supplied with the numeric values "3" in response to the input of the read control signal RD, the numeric values "3" are read into the down counter 14. Thereafter, the read numeric values "3" are respectively counted down one by one in synchronism with the leading edge of the clock signal CLK. A signal outputted from the OR gate 15 electrically connected to the output terminals Q0 through Q2 of the down counter 14 is maintained at an H level until the output values of the down counter 14 reach "0". Namely, the access time prolonger 11 outputs a read control signal RDW longer than the read control signal RD in signal time width and having a signal time width of three (the value set to the FF 12) clock cycles from the OR gate 15.

Figure 3:
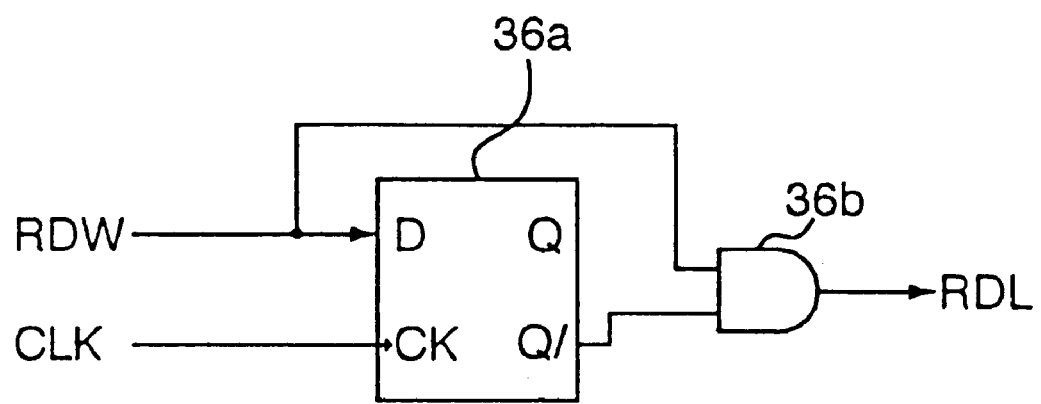
FIG. 3 is a diagram showing a configuration of a read latch generator.

FIG. 3 is a configurational diagram showing one example of the read latch generator 36 shown in FIG. 1.

The read latch generator 36 has an FF 36a. The read control signal RDW is inputted to an input terminal D of the FF 36a. The clock signal CLK is inputted to a clock terminal CK of the FF 36a. An inverse output terminal Q/ of the FF 36a is electrically connected to one input terminal of an AND gate 36b. The read control signal RDW is inputted to the other input terminal of the AND gate 36b.

The function of the read latch generator 36 is as follows:

The read control signal RDW is inputted to the input terminal D of the FF 36a. When the read control signal RDW is brought to an "H" level in synchronism with the leading edge of the clock signal CLK, the inverse output terminal Q/ of the FF 36a changes from an "H" level to an "L" level after a delay of one clock cycle alone. Accordingly, a read latch signal RDL whose signal time width is one clock cycle, is outputted from the output of the AND gate 36b.

Access operations of the microcomputer shown in FIG. 1 will next be described below in two parts (I) and (II) shown below.

(I) Access Operation to Memory:

When the CPU 10 performs the reading of data from the memory 20, the CPU 10 outputs an address signal ADR for specifying an address for the memory 20 to be accessed, to the address bus 41. Further, the CPU 10 outputs a read control signal RD to the read control line 43a. When the specification of the address by the address signal ADR is detected, a value stored at the corresponding address is read from the memory 20 in accordance with the read control signal RD and thereafter outputted to the address bus 42.

On the other hand, when the CPU 10 performs the writing of data into the memory 20, the CPU 10 outputs an address signal ADR for specifying an address for the memory 20 to be accessed, to the address bus 41. Further, the CPU 10 outputs a data signal DATA to the data bus 42. Moreover, the CPU 10 outputs a write control signal WR to the write control signal line 43*b*. In the memory 20, the data signal DATA is written into the address specified by the address signal ADR.

The respective input/output portions of the peripheral function unit 30 are respectively connected to the address bus 41, data bus 42, read control line 43*a* and write control line 43*b* via the buffer amplifier 31. Since loads presented by the input/output portions such as the timer 32 and the like provided within the peripheral function unit 30 are separated from the common bus 40 by the buffer amplifier 31, the load on the common bus 40 electrically connected to the CPU 10 and the memory 20 is reduced. Therefore, the CPU 10 can obtain access to the memory 20 at the original speed without being affected by the peripheral function unit 30.

Figure 4:
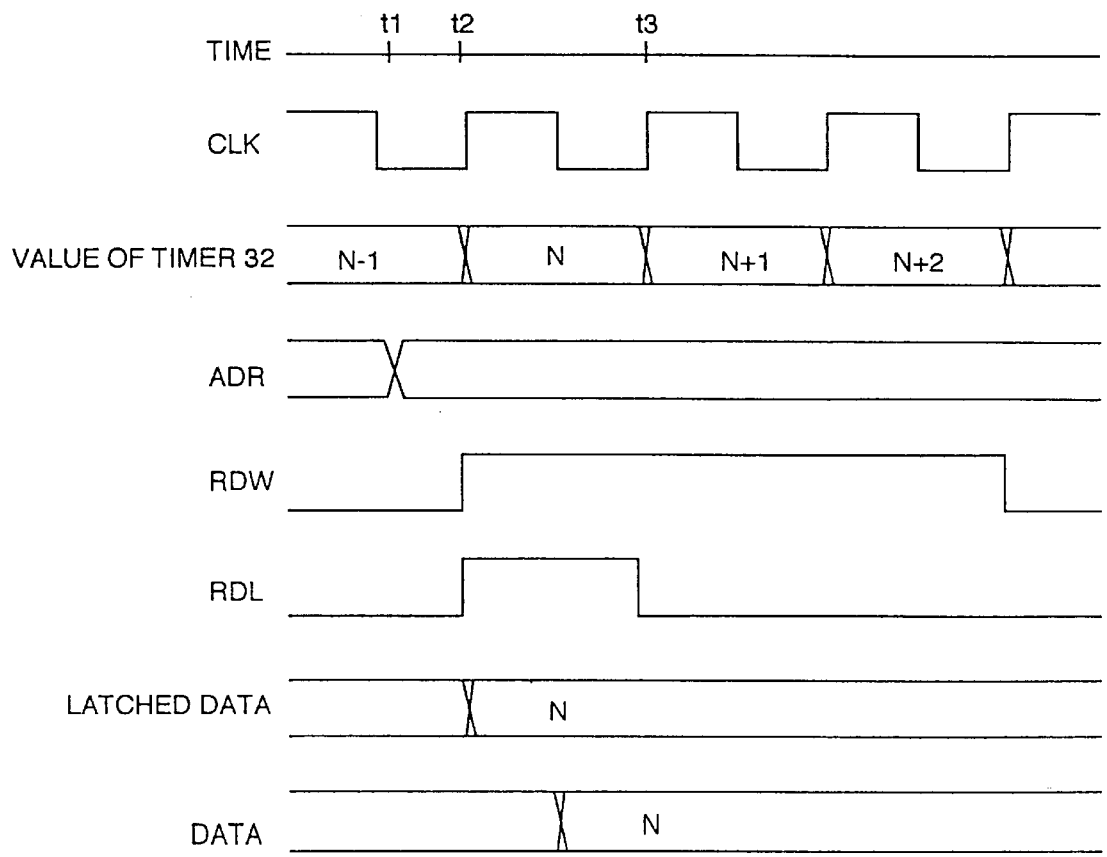
FIG. 4 is a diagram for describing a read operation of a timer 32.

(II) Access Operation to Peripheral function unit:

FIG. 4 is a timing chart for describing the reading of times of the timer 32 by the CPU 10 shown in FIG. 1.

The timer 32 will be taken as having counted times in synchronism with the leading edge of the clock signal CLK.

At a time t1 shown in FIG. 4, the CPU 10 outputs an address signal ADR for specifying the timer 32 to the address bus 41 to read a time counted by the timer 32.

At a time t2, the CPU 10 outputs a prolonged read control signal RDW in synchronism with the leading edge of the clock signal CLK. The result of count by the timer 32 becomes "N" in synchronism with the leading edge of the clock signal CLK at the time t2. On the other hand, a read latch signal RDL outputted from the read latch generator 36 is produced during one clock cycle as counted from the time t2. The read latch signal RDL is supplied to the timer 32. In the timer 32, data "N" corresponding to the result of count at that time is latched as output data, based on the read latch signal RDL. Next, the latched data "N" corresponding to the result of count is outputted to the data bus 42.

The CPU 10 reads the data "N" outputted to the data bus 42 in accordance with the read control signal RDW.

The read control signal RDW and the write control signal WRW are used for access to the respective input/output portions of the peripheral function unit 30 at the time of non-use of the read latch signal RDL. The access operation in this case is substantially similar to the access operation to the memory except that the read and write operations are delayed by a prolonged time. Since the signals on the common bus 40 are determined within the prolonged time, the read and write operations can be reliably executed.

Thus, the microcomputer according to the present embodiment can bring about the following advantages (1) through (4).

(1) The access time prolonger 11 makes the signal time width or interval of the read control signal RDW and the write control signal WRW for the peripheral function unit 30 longer than the time signal width of the read control signal RD and the write control signal WR for the access to the memory 20. Therefore, even if the access speed is reduced, the access to the peripheral function unit can be reliably performed.

(2) Since the access time prolonger 11 allows the FF 12 to arbitrarily set the signal time width of the read control signal RDW, access times suitable for the scale of the peripheral function unit 30 can be set.

(3) Since the respective input/output portions of the peripheral function unit 30 are electrically connected to the common bus 40 through the buffer amplifier 31 and the loads on the peripheral function unit 30 are disconnected from the common bus 40 upon access to the memory, the access speed to the memory is not limited by the scale of the peripheral function unit 30.

(4) Since the timer 32 activated in quick timing can hold data in proper timing in accordance with the read latch signal RDL produced from the read latch generator 36, the accurate data held in proper timing can be read even if the access speed of the timer 32 is limited.

The present invention is not limited to the abovedescribed embodiment and various modifications can be made thereto.

The following modifications (a) through (d) will be explained as examples.

(a) The access time prolonger 11 shown in FIG. 2 comprises the FF 12, the AND gates 12*a* through 12*c* and the down counter 14. However, if the access time prolonger 11 is of a circuit for generating a signal having a signal time width longer than the signal time width of the read control signal RD and the write control signal WR, then any circuit configurations may be used.

(b) In the present embodiment, the buffer amplifier 31 is used to separate the loads on the peripheral function unit 30 from the common bus 40. However, for example, a configuration for controlling the state of electrical connections between the peripheral function unit 30 and the common bus 40 in accordance with the read control signal RDW and the write control signal WRW may be adopted.

(c) The read latch generator 36 shown in FIG. 4 comprises the FF 36*a* and the AND gate 36*b*. However, if one for outputting a signal having a signal time width shorter than that of the read control signal RDW is used as the read latch generator 36, then any configurations may be adopted.

(d) The use of the read latch signal RDL outputted from the read latch generator 36 is not necessarily limited to the timer 32. The read latch signal RDL may be used for holding the state of an input/output portion rapid in the change of state, such as a polling-mode series data input/output portion or the like so that accurate data can be read.

While the present invention has been described with reference to the illustrative embodiment, this description is not intended to be construed in a limiting sense. Various modifications of the illustrative embodiment will be apparent to those skilled in the art on reference to this description. It is therefore contemplated that the appended claims will cover any such modifications or embodiment as fall within the true scope of the invention.

What is claimed is:

1. A microcomputer comprising:

a memory;

a peripheral circuit including a data generating circuit for generating data, the data generating circuit latching the data in response to a data latch signal and outputting the latched data therefrom in response to a first read control signal, and a data latch signal generating circuit supplied with the first read control signal so as to generate the data latch signal, said data latch signal having a signal time width which is shorter than that of the first read control signal; and a central processing unit connected to said memory and said peripheral circuit through a common bus, said central processing unit outputting an address signal for specifying said peripheral circuit and the first read control signal to said common bus to access said peripheral circuit, and outputting an address signal for specifying said memory and a second read control signal, having a signal time width which is shorter than the first read control signal, to said common bus to access said memory.

2. A microcomputer according to claim 1, wherein said data generating circuit is a timer for performing a count operation, latching data obtained by the count operation in response to the data latch signal, and outputting the latched data in response to the first read control signal.

3. A microcomputer according to claim 1, wherein said memory stores a program including a memory reference instruction, and processing data therein, and said central processing unit performs digital processing based on the program stored in said memory and outputs the address signal for specifying said data generating circuit, the address signal for specifying said memory, the first read control signal and the second read control signal to said common bus in accordance with the memory reference instruction.

4. A microcomputer according to claim 1, wherein said peripheral circuit has a buffer which is connected to said common bus and said data generating circuit and disconnects a load presented by said data generating circuit from said common bus.

5. A microcomputer according to claim 4, wherein said peripheral circuit has a second buffer which is connected to said common bus and said data latch signal generating circuit and disconnects a load presented by said data latch signal generating circuit from said common bus.

6. A microcomputer according to claim 1, wherein said peripheral circuit has a switch circuit which is connected to said common bus and said data generating circuit and disconnects a load presented by said data generating circuit from said common bus when said central processing unit is performing access to said memory.

7. A microcomputer according to claim 6, wherein said peripheral circuit has a switch circuit which is connected to said common bus and said data latch signal generating circuit and disconnects a load presented by said data latch signal generating circuit from said common bus when said central processing unit is performing access to said memory.

8. A microcomputer according to claim 1, wherein said peripheral circuit includes input/output circuits for respectively swapping signals with the outside, and said each input/output circuit is accessed according to an address signal for specifying said input/output circuit and the first read control signal.

9. A microcomputer comprising:

a memory for storing therein a program including a memory reference instruction and processing data;

a common bus;

a peripheral circuit having a first circuit whose change of state is fast, said first circuit latching data to be held by said first circuit therein in response to a data latch signal and outputting the latched data therefrom in response to a first read control signal, a data latch signal generating circuit supplied with the first read control signal so as to generate the data latch signal shorter than the first read control signal in signal time width, and a separation circuit connected between said first circuit and said common bus and between said data latch signal generating circuit and said common bus and adapted to disconnect loads presented by said first circuit and said data latch signal generating circuit from said common bus; and a central processing unit connected to said memory and said peripheral circuit through said common bus, said central processing unit performing digital processing based on the program stored in said memory and outputting an address signal, the first read control signal and a second read control signal shorter than the first read control signal in signal time width to said common bus in accordance with the memory reference instruction, said central processing unit outputting the first read control signal to said common bus to obtain access to said first circuit and outputting the second read control signal to said common bus to obtain access to said memory.

10. A microcomputer according to claim 9, wherein said first circuit is a timer for performing a count operation, latching data obtained by the count operation in response to the data latch signal, and outputting the latched data in response to the first read control signal.

11. A microcomputer according to claim 9, wherein said separation circuit is a switch circuit for disconnecting a load presented by said each input/output circuit from said common bus when said central processing unit is performing access to said memory.

12. A microcomputer according to claim 9, wherein said separation circuit is a buffer.

* * * * *